US009247363B2

(12) United States Patent
Triplett et al.

(10) Patent No.: US 9,247,363 B2
(45) Date of Patent: Jan. 26, 2016

(54) PLAYBACK QUEUE TRANSFER IN A MEDIA PLAYBACK SYSTEM

(71) Applicant: Sonos, Inc., Santa Barbara, CA (US)

(72) Inventors: Mark W. Triplett, St. Charles, IL (US); Robert Reimann, Newton, MA (US)

(73) Assignee: Sonos, Inc., Santa Barbara, CA (US)

( * ) Notice: Subject to any disclaimer, the term of this patent is extended or adjusted under 35 U.S.C. 154(b) by 139 days.

(21) Appl. No.: 13/864,086

(22) Filed: Apr. 16, 2013

(65) Prior Publication Data

US 2014/0310597 A1    Oct. 16, 2014

(51) Int. Cl.
  *G06F 3/0482*    (2013.01)
  *H04R 27/00*    (2006.01)
  *H04L 12/28*    (2006.01)
  *H04N 1/00*    (2006.01)
  *H04R 3/12*    (2006.01)

(52) U.S. Cl.
  CPC ............... *H04R 27/00* (2013.01); *H04L 12/28* (2013.01); *H04L 12/2812* (2013.01); *H04N 1/00* (2013.01); *H04L 2012/2849* (2013.01); *H04R 3/12* (2013.01); *H04R 2227/003* (2013.01); *H04R 2227/005* (2013.01); *H04R 2420/07* (2013.01)

(58) Field of Classification Search
  CPC ............ G06F 17/30053; G06F 3/0482; G06F 17/30017; G06F 17/30772; G06F 11/3438
  See application file for complete search history.

(56) References Cited

U.S. PATENT DOCUMENTS 5,406,634 A    4/1995  Anderson et al.
5,856,827 A    1/1999  Sudo
5,923,902 A    7/1999  Inagaki
6,002,862 A    12/1999 Takaike
6,181,316 B1   1/2001  Little et al.
6,255,961 B1   7/2001  Van Ryzin et al.
6,256,554 B1   7/2001  Dilorenzo (Continued)

FOREIGN PATENT DOCUMENTS

KR  20090017795   2/2009
WO    0153994    7/2001

(Continued)

OTHER PUBLICATIONS

International Search Report for PCT/US2014/034292 mailed on Aug. 14, 2014.

(Continued)

*Primary Examiner* — Namitha Pillai
(74) *Attorney, Agent, or Firm* — McDonnell Boehnen Hulbert & Berghoff LLP

(57) ABSTRACT

Embodiments are provided for using a user interface to transfer a playback queue from one playback zone to another within a network media system. The interface may provide a first zone representation of a playback zone, and a first queue representation of a first group of playable items in a particular relative position. The particular relative position of the first queue representation may indicate that the playback queue associated with the first playback zone includes the first group of playable items. The interface may receive an input indicating a movement of a second queue representation to the particular relative position. In response, the first queue representation may be removed from the particular relative position and the second queue representation may be provided in the particular relative position, indicating that the playback queue now comprises a second group of playable items represented by the second queue representation.

22 Claims, 13 Drawing Sheets

(56) References Cited

U.S. PATENT DOCUMENTS

| | | |
|---|---|---|
| 6,404,811 B1 | 6/2002 | Cvetko et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,178,106 B2 | 2/2007 | Lamkin et al. |
| 7,187,947 B1 | 3/2007 | White et al. |
| 7,236,773 B2 | 6/2007 | Thomas |
| 7,312,785 B2 | 12/2007 | Tsuk et al. |
| 7,358,960 B2 | 4/2008 | Mak |
| 7,483,538 B2 | 1/2009 | McCarty et al. |
| 7,571,014 B1 * | 8/2009 | Lambourne et al. ............ 700/94 |
| 7,643,894 B2 | 1/2010 | Braithwaite et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,742,740 B2 | 6/2010 | Goldberg et al. |
| 7,805,682 B1 * | 9/2010 | Lambourne ................... 715/764 |
| 7,853,341 B2 | 12/2010 | McCarty et al. |
| 7,958,441 B2 | 6/2011 | Heller et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,072,905 B2 | 12/2011 | Haff et al. |
| 8,074,253 B1 | 12/2011 | Nathan |
| 8,099,313 B2 | 1/2012 | Messer et al. |
| 8,103,009 B2 | 1/2012 | McCarty et al. |
| 8,131,390 B2 | 3/2012 | Braithwaite et al. |
| 8,140,974 B2 | 3/2012 | Hayter et al. |
| 8,204,890 B1 | 6/2012 | Gogan |
| 8,234,395 B2 | 7/2012 | Millington |
| 8,290,603 B1 | 10/2012 | Lambourne |
| 8,316,154 B2 | 11/2012 | Yoneda |
| 8,483,853 B1 | 7/2013 | Lambourne |
| 8,544,046 B2 | 9/2013 | Gran et al. |
| 8,588,949 B2 | 11/2013 | Lambourne et al. |
| 8,799,395 B2 | 8/2014 | Seidel et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0079038 A1 | 4/2003 | Robbin et al. |
| 2003/0157951 A1 | 8/2003 | Hasty |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0155072 A1 | 7/2005 | Kaczowka et al. |
| 2005/0166157 A1 | 7/2005 | Ollis et al. |
| 2005/0262253 A1 | 11/2005 | Li et al. |
| 2006/0002681 A1 | 1/2006 | Spilo et al. |
| 2006/0041639 A1 | 2/2006 | Lamkin et al. |
| 2006/0107237 A1 | 5/2006 | Kim |
| 2006/0156236 A1 | 7/2006 | Heller et al. |
| 2006/0168340 A1 | 7/2006 | Heller et al. |
| 2006/0195480 A1 | 8/2006 | Spiegelman et al. |
| 2006/0218294 A1 | 9/2006 | Rosenberg |
| 2006/0253782 A1 | 11/2006 | Stark et al. |
| 2006/0263048 A1 | 11/2006 | Sato et al. |
| 2007/0038999 A1 | 2/2007 | Millington et al. |
| 2007/0083897 A1 * | 4/2007 | Brownell ........................ 725/61 |
| 2007/0142944 A1 | 6/2007 | Goldberg et al. |
| 2007/0169087 A1 | 7/2007 | Fadell |
| 2007/0266065 A1 | 11/2007 | Rosenberg |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0059567 A1 | 3/2008 | Williams et al. |
| 2008/0133715 A1 | 6/2008 | Yoneda et al. |
| 2008/0134256 A1 | 6/2008 | Dacosta |
| 2008/0177822 A1 | 7/2008 | Yoneda |
| 2008/0209487 A1 | 8/2008 | Osann et al. |
| 2008/0242222 A1 | 10/2008 | Bryce et al. |
| 2009/0006542 A1 | 1/2009 | Feldman et al. |
| 2009/0172542 A1 | 7/2009 | Girish et al. |
| 2009/0197524 A1 | 8/2009 | Haff et al. |
| 2009/0228919 A1 | 9/2009 | Zott et al. |
| 2009/0248702 A1 | 10/2009 | Schwartz et al. |
| 2009/0249222 A1 | 10/2009 | Schmidt et al. |
| 2009/0275285 A1 | 11/2009 | Maricevic et al. |
| 2010/0005496 A1 | 1/2010 | Ellis et al. |
| 2010/0042235 A1 | 2/2010 | Basso et al. |
| 2010/0082725 A1 | 4/2010 | Onishi |
| 2010/0082731 A1 | 4/2010 | Haughay et al. |
| 2010/0087214 A1 | 4/2010 | Bournel et al. |
| 2010/0095332 A1 | 4/2010 | Gran et al. |
| 2010/0211438 A1 | 8/2010 | Lutnick et al. |
| 2010/0299402 A1 | 11/2010 | Korman et al. |
| 2010/0299639 A1 * | 11/2010 | Ramsay et al. ................ 715/835 |
| 2010/0303244 A1 | 12/2010 | Kim et al. |
| 2011/0004330 A1 | 1/2011 | Rothkopf et al. |
| 2011/0055901 A1 | 3/2011 | Karaoguz et al. |
| 2011/0060998 A1 | 3/2011 | Schwartz et al. |
| 2011/0066943 A1 | 3/2011 | Brillon et al. |
| 2011/0131272 A1 | 6/2011 | Littlejohn et al. |
| 2011/0131518 A1 | 6/2011 | Ohashi |
| 2011/0179455 A1 | 7/2011 | Thompson |
| 2011/0225496 A1 | 9/2011 | Jeffe et al. |
| 2011/0252118 A1 | 10/2011 | Pantos et al. |
| 2011/0265003 A1 | 10/2011 | Schubert et al. |
| 2011/0295974 A1 | 12/2011 | Kashef et al. |
| 2012/0029672 A1 | 2/2012 | Hamilton et al. |
| 2012/0050012 A1 | 3/2012 | Alsina et al. |
| 2012/0054808 A1 | 3/2012 | Nijim |
| 2012/0057853 A1 | 3/2012 | Huber et al. |
| 2012/0089910 A1 | 4/2012 | Cassidy |
| 2012/0113964 A1 | 5/2012 | Petersen et al. |
| 2012/0117026 A1 | 5/2012 | Cassidy |
| 2012/0117193 A1 | 5/2012 | Phillips et al. |
| 2012/0117586 A1 | 5/2012 | McCoy et al. |
| 2012/0147825 A1 | 6/2012 | Hassan et al. |
| 2012/0174204 A1 | 7/2012 | Sturm et al. |
| 2012/0202485 A1 | 8/2012 | Mirbaha et al. |
| 2012/0227076 A1 | 9/2012 | McCoy et al. |
| 2012/0233067 A1 | 9/2012 | Matthew et al. |
| 2012/0284423 A1 | 11/2012 | Weel |
| 2012/0304233 A1 | 11/2012 | Roberts et al. |
| 2012/0311094 A1 | 12/2012 | Biderman et al. |
| 2012/0311618 A1 | 12/2012 | Blaxland |
| 2013/0024018 A1 | 1/2013 | Chang et al. |
| 2013/0054742 A1 | 2/2013 | Tsuji et al. |
| 2013/0073584 A1 | 3/2013 | Kuper et al. |
| 2013/0111529 A1 | 5/2013 | Yao et al. |
| 2013/0151728 A1 | 6/2013 | Currier |
| 2013/0165164 A1 | 6/2013 | Rowe |
| 2013/0246916 A1 | 9/2013 | Reimann et al. |
| 2013/0254207 A1 | 9/2013 | Coburn, IV et al. |
| 2013/0326041 A1 | 12/2013 | Bellet et al. |
| 2013/0346859 A1 * | 12/2013 | Bates et al. .................... 715/716 |
| 2013/0347117 A1 | 12/2013 | Parks et al. |
| 2014/0006947 A1 | 1/2014 | Garmark et al. |

(56) References Cited

U.S. PATENT DOCUMENTS

| | | | |
|---|---|---|---|
| 2014/0075308 A1 | 3/2014 | Sanders et al. |
| 2014/0080479 A1 | 3/2014 | Vangala et al. |
| 2014/0096166 A1 | 4/2014 | Gordon et al. |
| 2014/0115462 A1 | 4/2014 | Reznor et al. |
| 2014/0122737 A1 | 5/2014 | Silberstein et al. |
| 2014/0169569 A1 | 6/2014 | Toivanen et al. |
| 2014/0195587 A1 | 7/2014 | Sukoff et al. |

FOREIGN PATENT DOCUMENTS

| | | |
|---|---|---|
| WO | 2013049346 A1 | 4/2013 |
| WO | 2013101727 | 7/2013 |

OTHER PUBLICATIONS

Written Opinion of the International Searching Authority for PCT/US2014/034292 mailed on Aug. 14, 2014.
Bluetooth. "Specification of the Bluetooth System: The ad hoc SCATTERNET for affordable and highly functional wireless connectivity" Core, Version 1.0 A, Jul. 26, 1999, 1068 pages.
Bluetooth. "Specification of the Bluetooth System: Wireless connections made easy" Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
Jo J., et al., "Synchronized One-to-many Media Streaming with Adaptive Playout Control," Proceedings of SPIE, 2002, vol. 4861, pp. 71-82.
Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages.
Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.
Palm, Inc. "Handbook for the Palm VII Handheld" May 2000, 311 pages.
"Presentations at WinHEC 2000" May 2000, 138 pages.
AudioTron Setup Guide, Version 3.0, Voyetra Turtle Beach, Inc., May 2002, 38 pages.
Final Office Action mailed on Jun. 23, 2015, issued in connection with U.S. Appl. No. 13/904,896, filed May 29, 2013, 16 pages.
Final Office Action mailed on Aug. 25, 2015, issued in connection with U.S. Appl. No. 13/864,081, filed Apr. 16, 2013, 15 pages.
Final Office Action mailed on Jul. 8, 2015, issued in connection with U.S. Appl. No. 14/520,566, filed Oct. 22, 2014, 8 pages.
Non-Final Office Action mailed on Aug. 19, 2015, issued in connection with U.S. Appl. No. 13/864,075, filed Apr. 16, 2013, 18 pages.
Non-Final Office Action mailed on May 28, 2015, issued in connection with U.S. Appl. No. 14/628,952, filed Feb. 23, 2015, 9 pages.
Final Office Action mailed on Aug. 28, 2015, issued in connection with U.S. Appl. No. 13/904,936, filed May 29, 2013, 10 pages.
Non-Final Office Action mailed on Feb. 13, 2015, issued in connection with U.S. Appl. No. 13/904,936, filed May 29, 2013, 10 pages.
Advisory Action mailed on Oct. 16, 2013, issued in connection with U.S. Appl. No. 13/341,237, filed Dec. 30, 2011, 3 pages.

"Australian Intellectual Property Office, "Patent Examination Report No. 1", issued in connection with Australian patent application No. 2012362573, issued on Jan. 16, 2015, 3 pages".
Final Office Action mailed on Apr. 22, 2015, issued in connection with U.S. Appl. No. 13/341,237, filed Dec. 30, 2011, 11 pages.
Final Office Action mailed on Apr. 14, 2014, issued in connection with U.S. Appl. No. 13/341,237, filed Dec. 30, 2011, 12 pages.
Final Office Action mailed on Aug. 6, 2013, issued in connection with U.S. Appl. No. 13/341,237, filed Dec. 30, 2011, 14 pages.
"International Preliminary Search Report for Application No. PCT/US2012/071212, mailed Jul. 10, 2014, 8 pages".
"International Search Report for Application No. PCT/US2014/039669, mailed on Sep. 22, 2014, 3 pages".
"International Search Report for PCT/US2014/034290 mailed Aug. 21, 2014".
"International Search Report for PCT/US2014/034372 mailed Aug. 20, 2014".
Non-Final Office Action mailed on Mar. 10, 2015, issued in connection with U.S. Appl. No. 13/864,081, filed Apr. 16, 2013, 13 pages.
Non-Final Office Action mailed on Mar. 13, 2015, issued in connection with U.S. Appl. No. 13/904,949, filed May 29, 2013, 20 pages.
Non-Final Office Action mailed on Mar. 2, 2015, issued in connection with U.S. Appl. No. 13/904,896, filed May 29, 2013, 15 pages.
Non-Final Office Action mailed on Apr. 23, 2015, issued in connection with U.S. Appl. No. 13/904,944, filed May 29, 2013, 12 pages.
Non-Final Office Action mailed on Dec. 30, 2014, issued in connection with U.S. Appl. No. 14/520,566, filed Oct. 22, 2014, 10 pages.
Non-Final Office Action mailed on Oct. 8, 2014, issued in connection with U.S. Appl. No. 13/341,237, filed Dec. 30, 2011, 12 pages.
Non-Final Office Action mailed on Jan. 25, 2013, issued in connection with U.S. Appl. No. 13/341,237, filed Dec. 30, 2011, 9 pages.
Non-Final Office Action mailed on Nov. 26, 2013, issued in connection with U.S. Appl. No. 13/341,237, filed Dec. 30, 2011, 15 pages.
""Sonos Multi-Room Music System User Guide," Version 090401, Sonos, Inc. Apr. 1, 2009, 256 pages".
""Sonos Wireless Dock Product Guide," Version 100101, Sonos, Inc. Oct. 10, 2001, 196 pages".
""SonosTM Digital Music System User Guide", Version: 070101, Sonos, Inc., Jan. 2007, 179 pages".
""Welcome. You're watching Apple TV." Apple TV 1st Generation Setup Guide, Apr. 8, 2008 Retrieved Oct. 14, 2014, 40 pages".
""Welcome. You're watching Apple TV." Apple TV 2nd Generation Setup Guide, Mar. 10, 2011 Retrieved Oct. 16, 2014, 35 pages".
""Welcome. You're watching Apple TV." Apple TV 3rd Generation Setup Guide, Mar. 16, 2012 Retrieved Oct. 16, 2014, 35 pages".
"Written Opinion of the International Searching Authority for Application No. PCT/US2014/039669, mailed on Sep. 22, 2014, 5 pages".
"Written Opinion of the International Searching Authority for PCT/US2014/034290 mailed Aug. 21, 2014".
"Written Opinion of the International Searching Authority for PCT/US2014/034372 mailed Aug. 20, 2014".
Advisory Action mailed on Sep. 17, 2015, issued in connection with U.S. Appl. No. 14/520,566, filed Oct. 22, 2014, 4 pages.
European Patent Office, "The Extended European Search Report," issued in connection with European patent application No. 12861517.6, Jun. 9, 2015, 11 pages.
Final Office Action mailed on Sep. 25, 2015, issued in connection with U.S. Appl. No. 13/904,949, filed May 29, 2013, 14 pages.

* cited by examiner

PLAYBACK QUEUE TRANSFER IN A MEDIA PLAYBACK SYSTEM

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
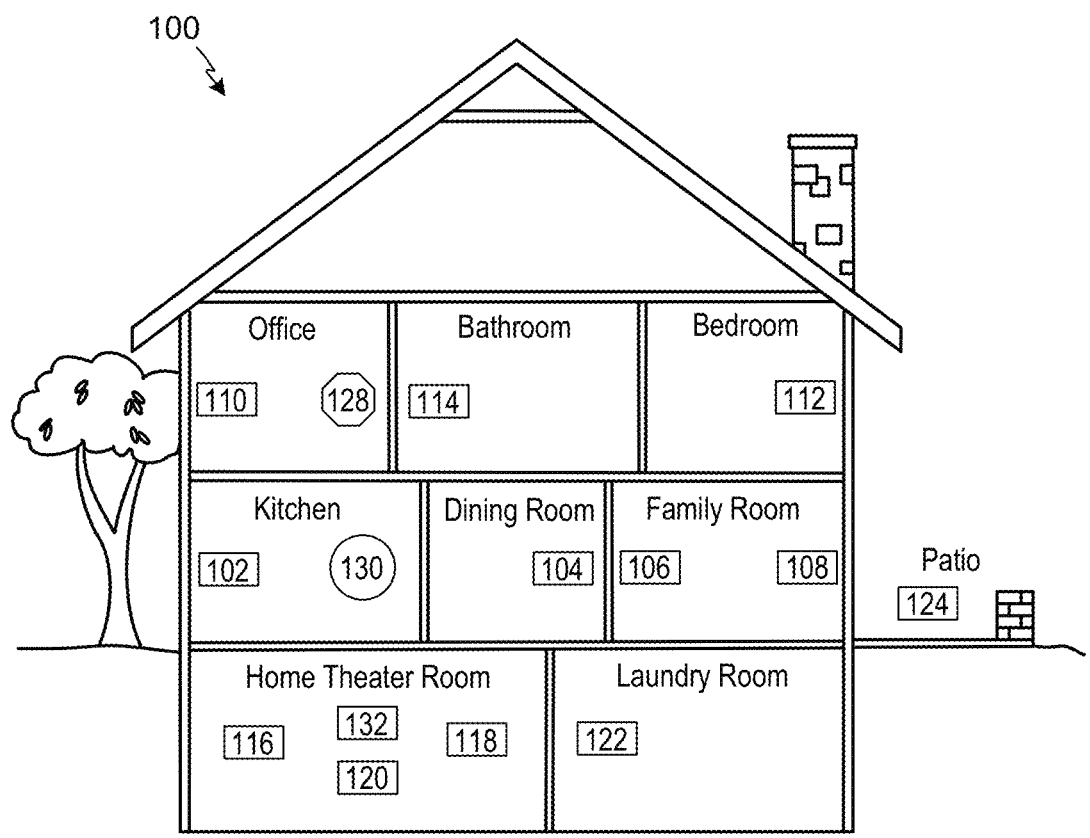
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve transferring a first playback queue from a first group of one or more playback zones to a second group of one or more playback zones within a network media system. The first playback queue may include one or more media items, or playlists of items, that have been added by one or more users of the network media system. The first playback queue may be associated with the first group of one or more playback zones, such that items in the first playback queue are items to be rendered by the first group. In one example, transferring the first playback queue from the first group to the second group may involve populating a second playback queue associated with the second group with the media items in the first playback queue. In one case, the rendering of the media items in the first playback queue may be extended from the first group to the second group in a substantially seamless manner during the transfer of the first playback queue.

In an example scenario, a user of the network media system may be hosting a dinner party and may have added music to the first playback queue for the dinner party. In this example, the first group of zones associated with the first playback queue may include the kitchen, dining room, and living room. After dinner, the dinner party may determine that the weather is nice and would prefer to continue their conversations on the porch rather than the living room. As such, a user may access a user interface of the network media system and transfer the first playback queue from the first group to the second group of zones such that the music may continue to play in the background during their conversations. In this case, the second group of zones may include the porch. In another case, the second group of zones may include the porch and the living room, in case some guests prefer to stay indoors.

The user interface accessed to transfer the first playback queue may be a user interface configured to manage and control the network media system, and may be provided on a device in communication with the network media system. In one instance, the user may transfer the first playback queue from the first zone to the second zone by dragging a graphic representation of the first playback queue to a graphic representation of the second zone.

As indicated, the present application involves transferring a first playback queue from a first group of one or more playback zones to a second group of one or more playback zones within a network media system. In one aspect, a method is provided. The method involves providing a first zone representation of a playback zone on an interface. The playback zone comprises one or more playback devices, and the playback zone is associated with a playback queue comprising playable items to be played by the playback zone. The method further involves providing a first queue representation of a first one or more playable items in a particular position relative to the first zone representation on the interface. The particular position of the first queue representation indicates that the playback queue associated with the first playback zone comprises the first one or more playable items. The method also involve receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

In another aspect, a non-transitory computer readable memory is provided. The non-transitory computer readable memory has stored thereon instructions executable by a computing device to cause the computing device to perform functions. The functions include providing a first zone representation of a playback zone on an interface. The playback zone comprises one or more playback devices, and the playback zone is associated with a playback queue comprising playable items to be played by the playback zone. The functions further include providing a first queue representation of a first one or more playable items in a particular position relative to the first zone representation on the interface. The particular position of the first queue representation indicates that the playback queue associated with the first playback zone comprises the first one or more playable items. The functions also include receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

In yet another aspect, a device is provided. The device includes a processor and memory having stored thereon instructions executable by the processor to perform functions. The functions include providing a first zone representation of a playback zone on an interface. The playback zone comprises one or more playback devices, and the playback zone is associated with a playback queue comprising playable items to be played by the playback zone. The functions further include providing a first queue representation of a first one or more playable items in a particular position relative to the first zone representation on the interface. The particular position of the first queue representation indicates that the playback queue associated with the first playback zone comprises the first one or more playable items. The functions also include receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
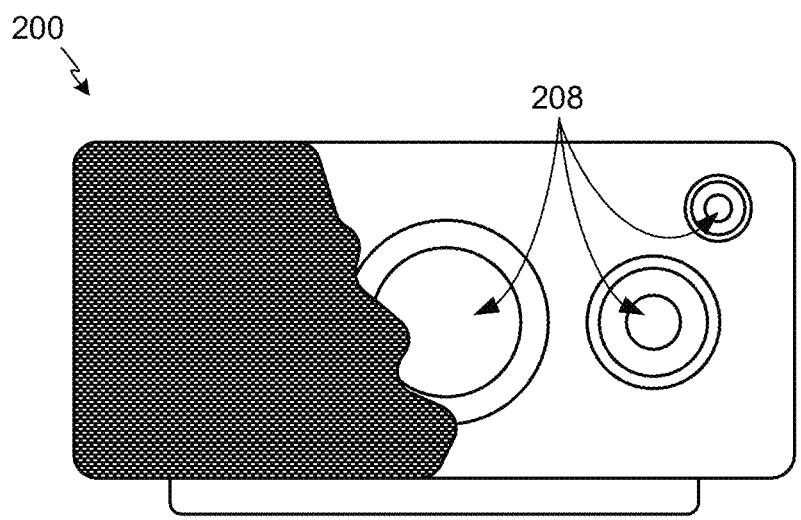
FIG. 2A shows an illustration of an example zone player having a built-in amplifier and transducers.
Figure 2B:
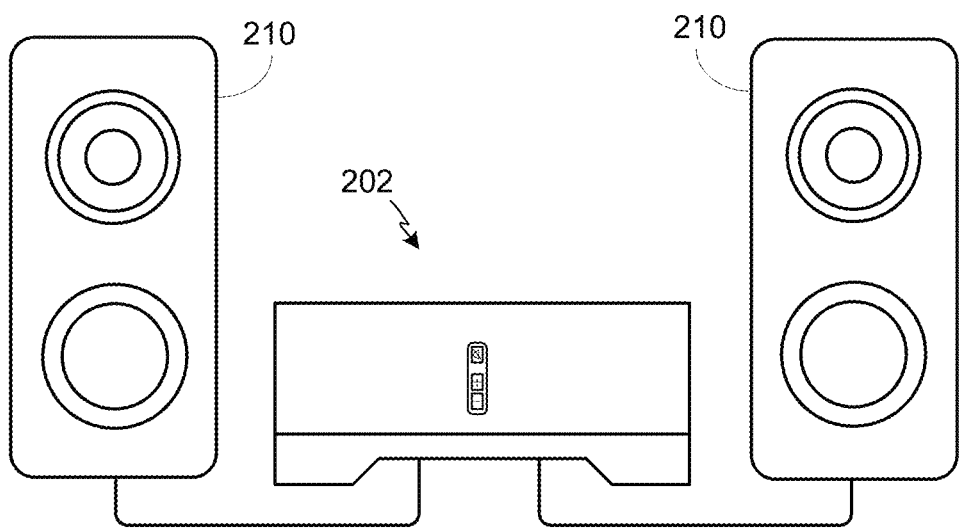
FIG. 2B shows an illustration of an example zone player having a built-in amplifier and connected to external speakers.
Figure 2C:
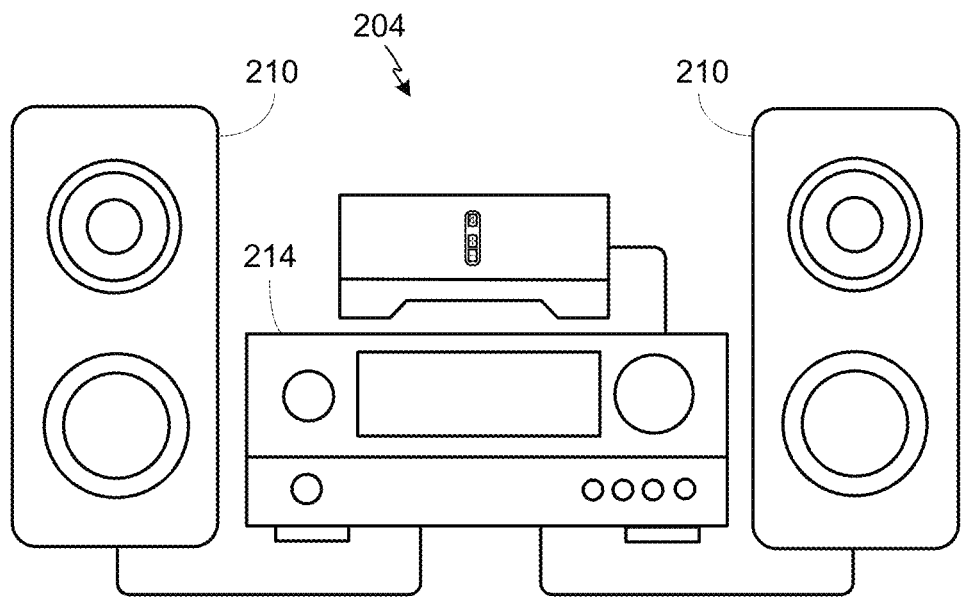
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
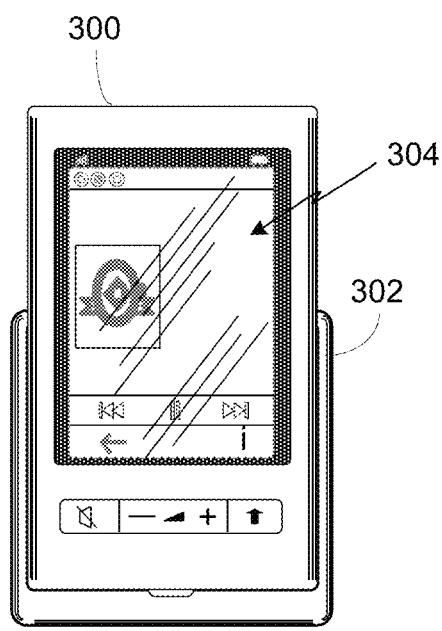
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
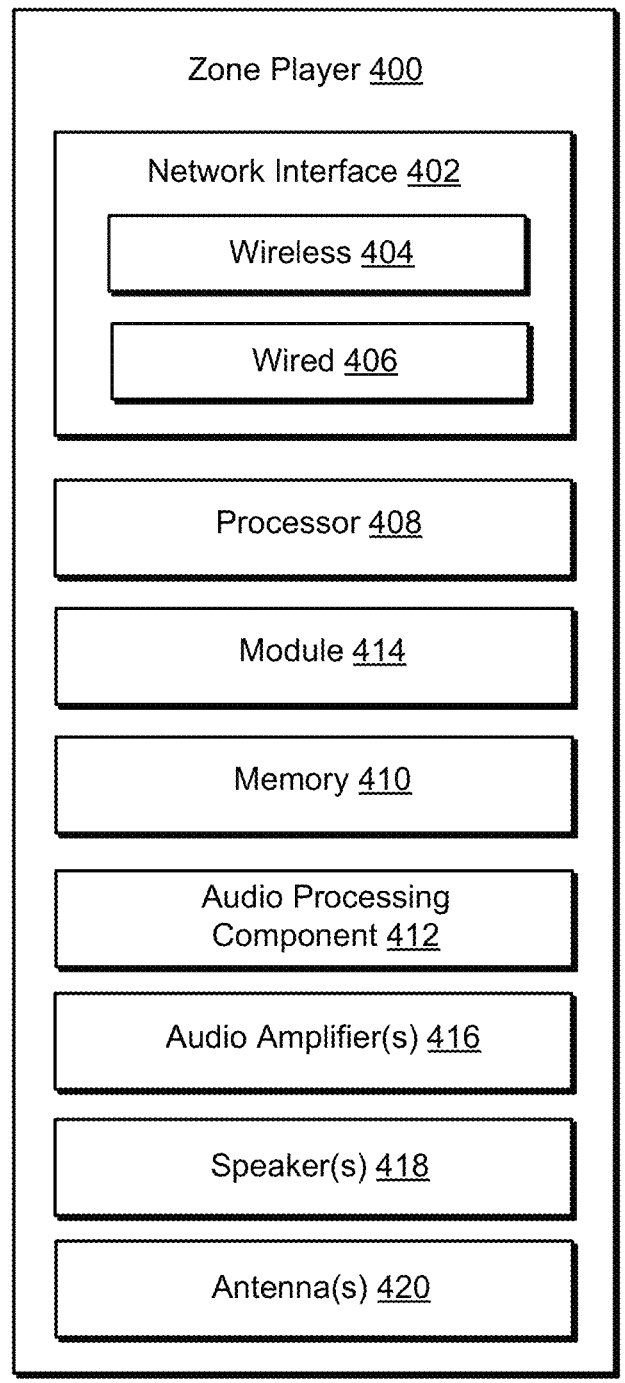
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
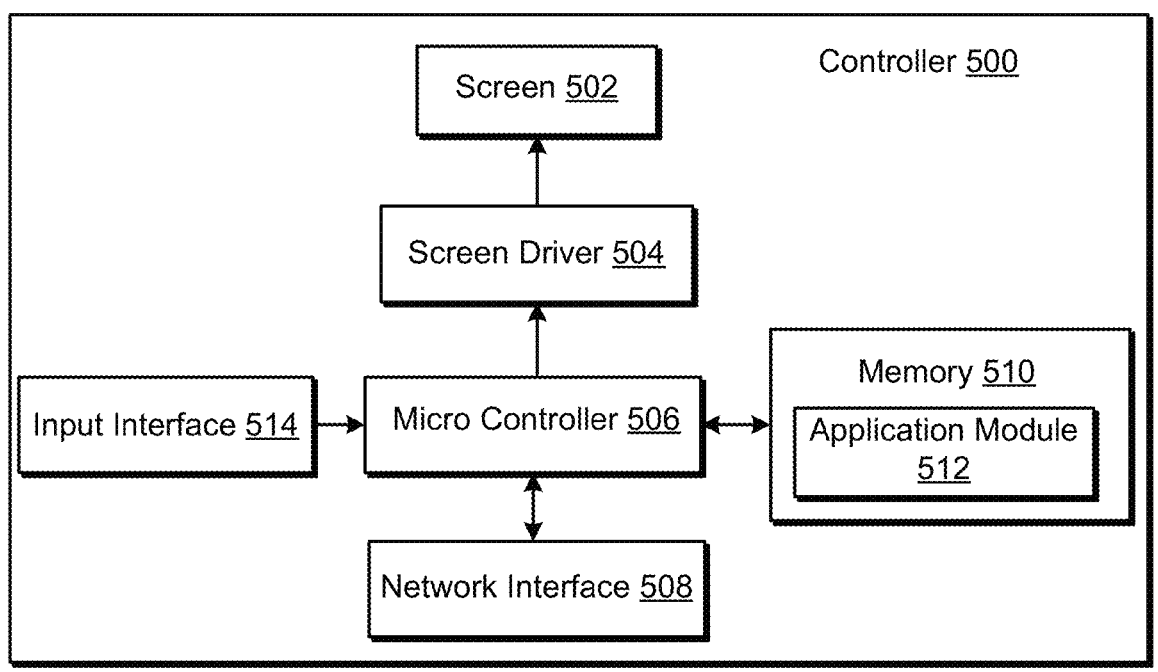
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
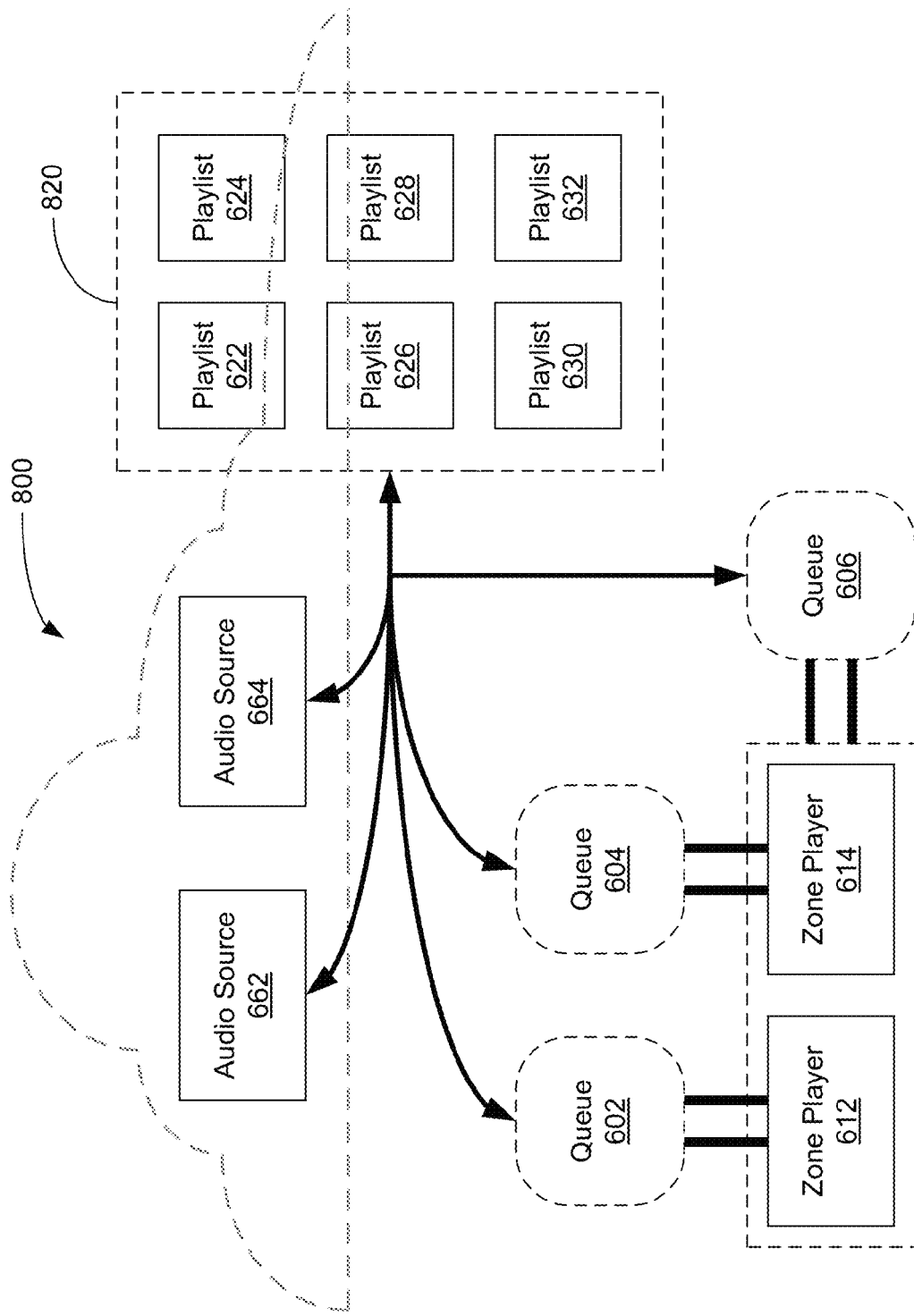
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e. URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
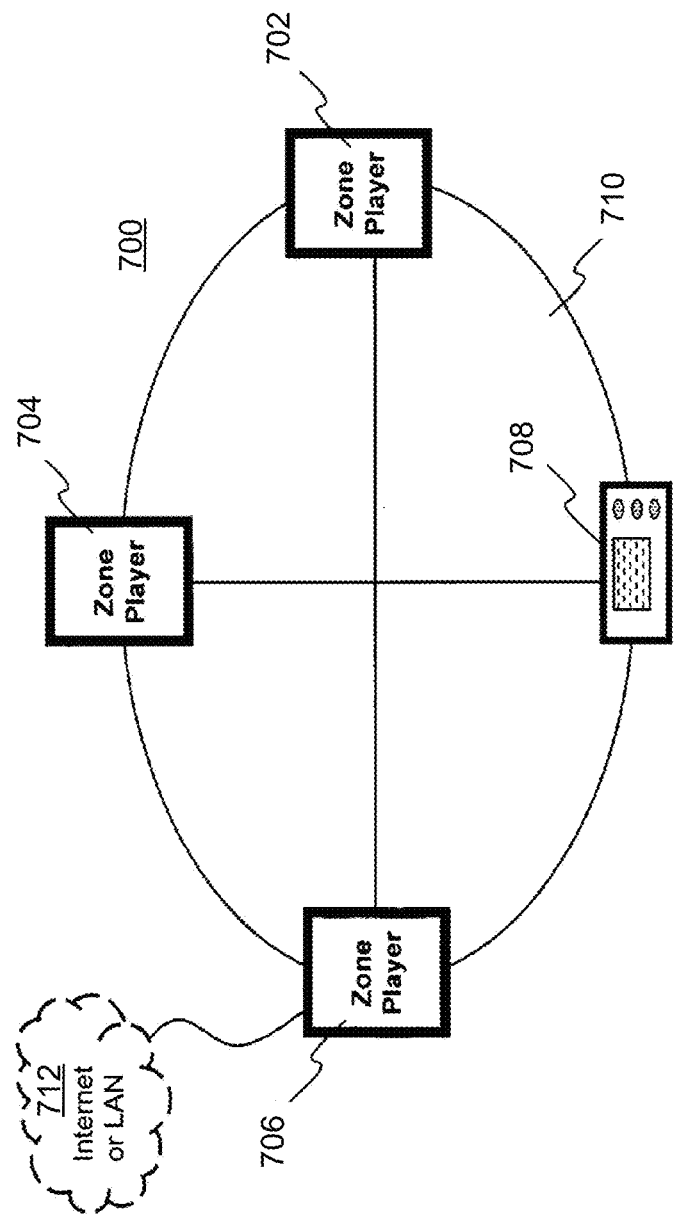
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
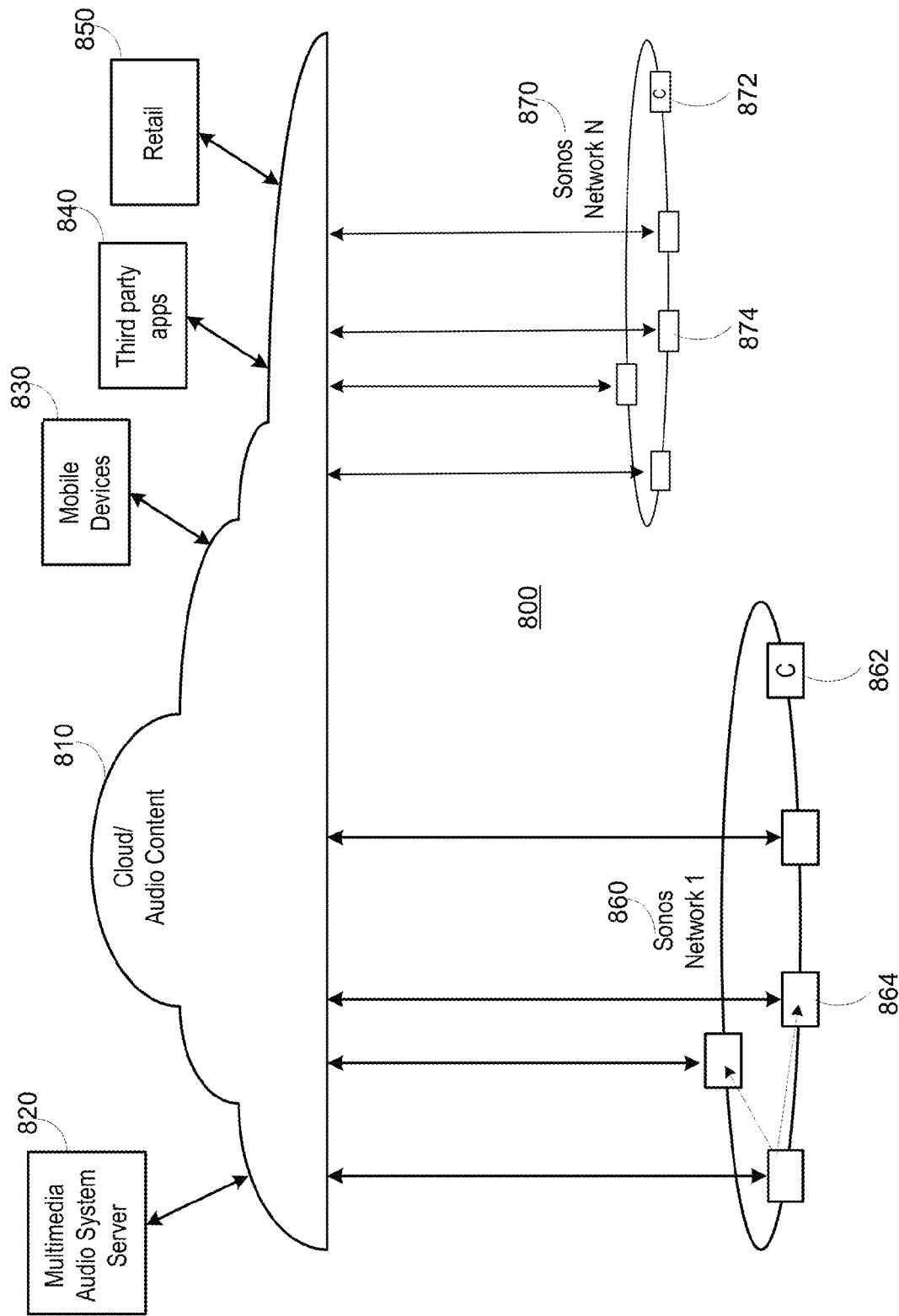
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Updating of Playlists in a Network Media System

Figure 9:
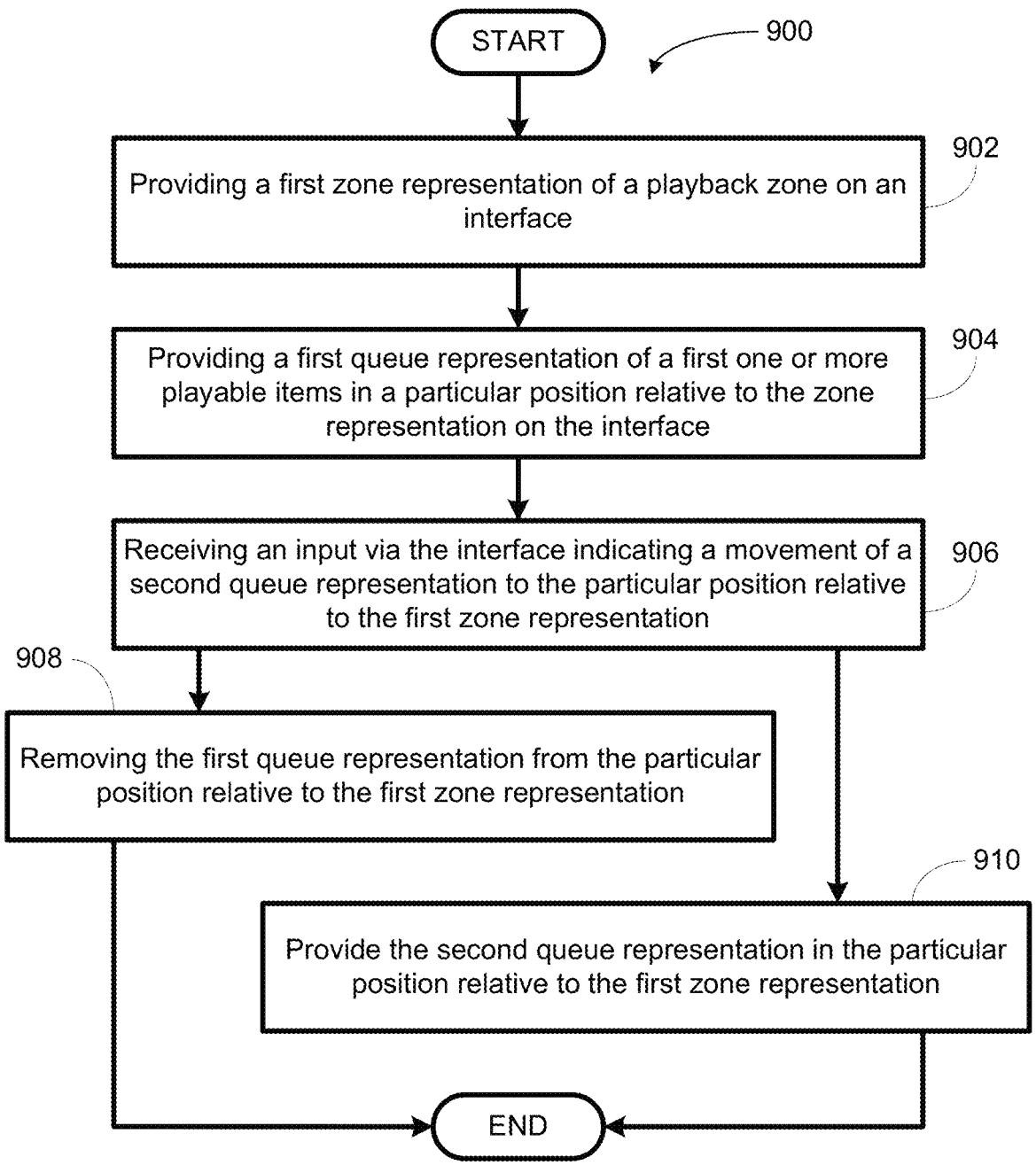
FIG. 9 shows an example flow diagram for transferring a playback queue in a network media system.

As discussed above, embodiments described herein involve transferring of a first playback queue from a first group of one or more playback zones to a second group of one or more playback zones within a network media system. FIG. 9 shows an example flow diagram for transferring a playback queue in a network media system, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-910. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 involves providing a first zone representation of a playback zone on an interface. The interface may be provided on the controller 130 as discussed above, in the form of an application running on a network-enabled device. In one case, the first controller interface may be an application associated with the network media system, such as a controller application for SONOS zone players. The interface may be accessible by a user to manage and control a network media system, which may include one or more playback zones, each including one or more playback devices. In one example, the device providing the user interface may include a touch-sensitive screen interface, such that the user may manage and control the network media system through touch inputs on the interface.

The one or more playback devices may include zone players by SONOS, Inc., as identified previously. As discussed in connection to FIG. 7, each zone of the network media system may have an associated playback queue, established to contain information identifying one or more media items to be played by the zone. In some cases, a particular playback queue may be associated with, or coupled to each zone or group of zones in the network media system.

The playback queue associated with the playback zone referenced in block 902 may be stored on a device. In one example, the device may be one or more of the one or more playback devices in the playback zone. In another example, the device may be a remote server, such as a cloud server accessible over the Internet by the one or more playback devices in the zone. In either case, the playback queue stored on the device may include one or more uniform resource identifiers (URIs) of the playable items in the playback queue to be played by the playback zone.

At block 904, the method 900 involves providing a first queue representation of a first one or more playable items in a particular position relative to the zone representation on the interface. In one example, the first queue representation may involve textual representations of the one or more playable items. The particular position of the first queue representation may indicate that the playback queue associated with the playback zone includes the first one or more playable items. In one case, the first queue representation may indicate the first one or more playable items currently being played by the first zone group.

Figures 10A, 10B:
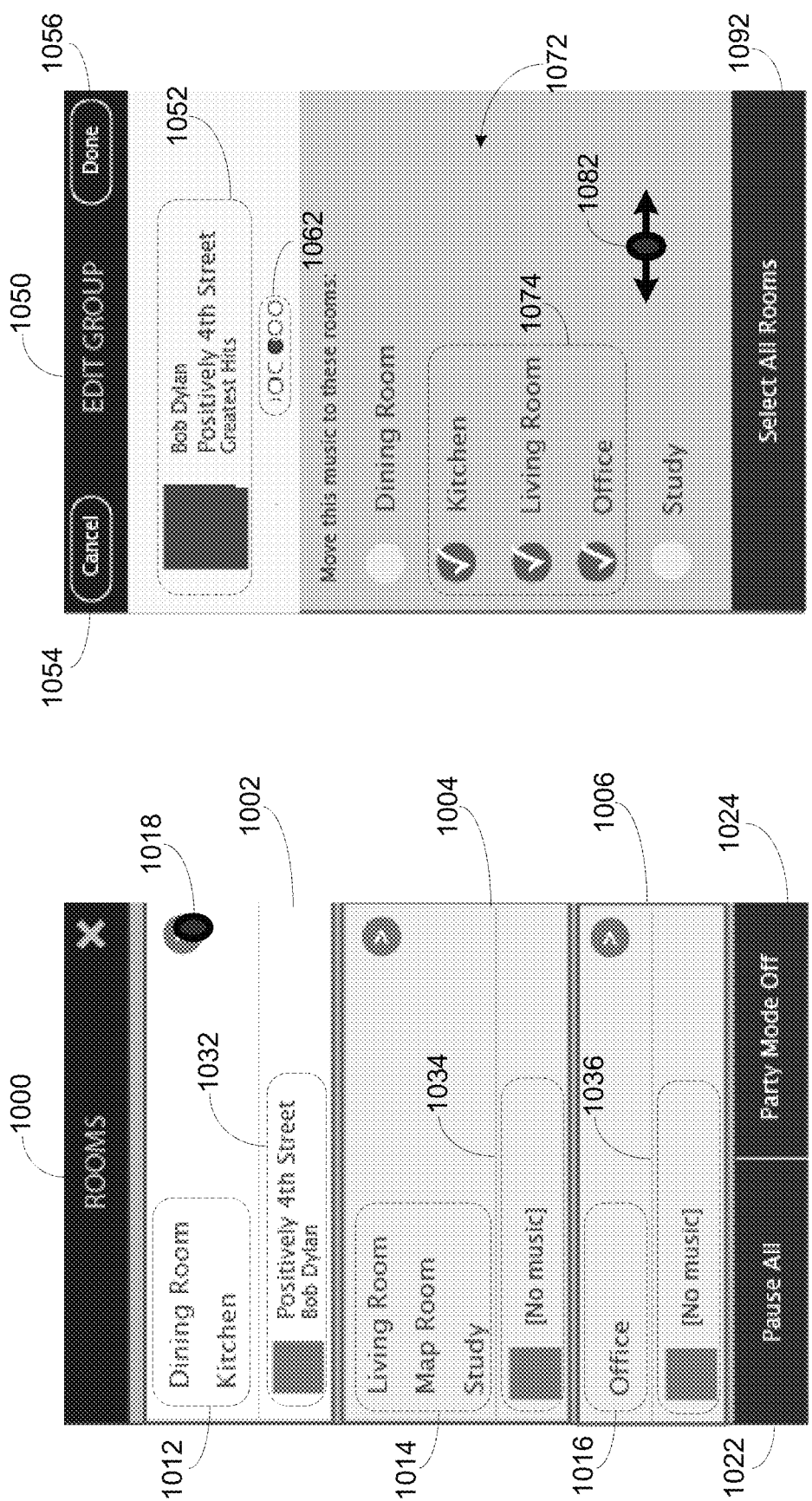
FIG. 10A shows a first example representation of a first example interface for transferring a playback queue in a network media system.
FIG. 10B shows a second example representation of the first example interface for transferring the playback queue in a network media system.

FIG. 10A shows a first example representation 1000 of a first example interface for transferring a playback queue in a network media system. The first example representation 1000 includes zone group representations 1002, 1004, and 1006. The zone group representation 1002 includes zone identifiers 1012 and playback identifier 1032. The zone identifiers 1012 may indicate zones that are in a zone group represented by the zone group representation 1002, and the playback identifier 1032 may indicate media content currently being played by the zone group represented by the zone group representation 1002. As shown, the playback identifier 1032 is in a relative position of the zone identifier 1012 indicating that a playback queue associated with the zone group representation 1002 includes the media content identified by the playback identifier 1032. Similarly, zone group representation 1004 may include zone identifiers 1014 and playback identifier 1034, and zone group representation 1006 may include zone identifiers 1016 and playback identifier 1036. The first example representation 1000 further includes selectable icons 1022 and 1024. The selectable icon 1022 may be selected to pause playback by all zones in the household, and the selectable icon 1024 may be selected to toggle between household zone playback modes. In this example, the selectable icon 1024 may be selected to turn off "party mode." In one case, "party mode" may involve a configuration of playback zones in the household for hosting social gatherings. In this case, another mode, such as "normal mode" may involve a configuration of the playback zones in the household for daily household routines.

As shown, the zone group represented by zone group representation 1002 includes zones "Dining Room" and "Kitchen," and is currently playing "Positively 4$^{th}$ Street" by Bob Dylan, while the zone group represented by zone group representation 1004 includes zones "Living Room," "Map Room," and "Study," and the zone group represented by zone group representation 1006 includes a zone "Office." Also as shown, zone groups represented by zone group representation 1004 and zone group representation 1006 are not currently playing any music. In one case, as suggested previously, the user may wish to transfer or extend the playback of "Positively 4$^{th}$ Street" to other zones or zone groups. In this case, the user may select 1018 the zone group 1002 to bring up a second example representation 1050 of the first example interface, as shown in FIG. 10B, to further manage and control the network media system.

The second example representation 1050 of FIG. 10B may include a playback identifier 1052, a zone list 1072, zone group side-swipe options indicator 1062, and selectable icons 1054, 1056, and 1092. The zone list 1072 may include a list of different zones in the household, and the playback identifier 1052 may indicate media content currently being played by zones in a zone group 1074. As shown, the playback identifier 1052 is in a relative position of the zone group 1074 within the zone list 1072 indicating that a playback queue associated with the zone group 1074 includes the media content identified by the playback identifier 1052. In some instances, the playback identifier 1052 may further be a queue identifier indicating media content in the playback queue associated with the zone group 1074.

In this case, the zone group 1074 may include "Kitchen," "Living Room," and "Office," which may have been previously selected and grouped together. In this case, the different zones in the household may further be selected or deselected to form different zone groups. In one example, the side-swipe options indicator 1062 may indicate that four other playback queues that may or may not yet be associated to a zone or zone group may also be available, and a swipe input 1082 may be used to navigate between the different playback queues. For instance, two of the other combinations may be accessed by swiping to the left, and two of the other combinations may be accessed by swiping to the right.

Further in this example, the selectable icon 1092 may be selected to select all zones listed in the zone list 1072, the selectable icon 1054 may be selected to cancel changes made to the zone group combinations, and the selectable icon 1056 may be selected to confirm or save changes made to the zone group combinations.

Figure 11A:
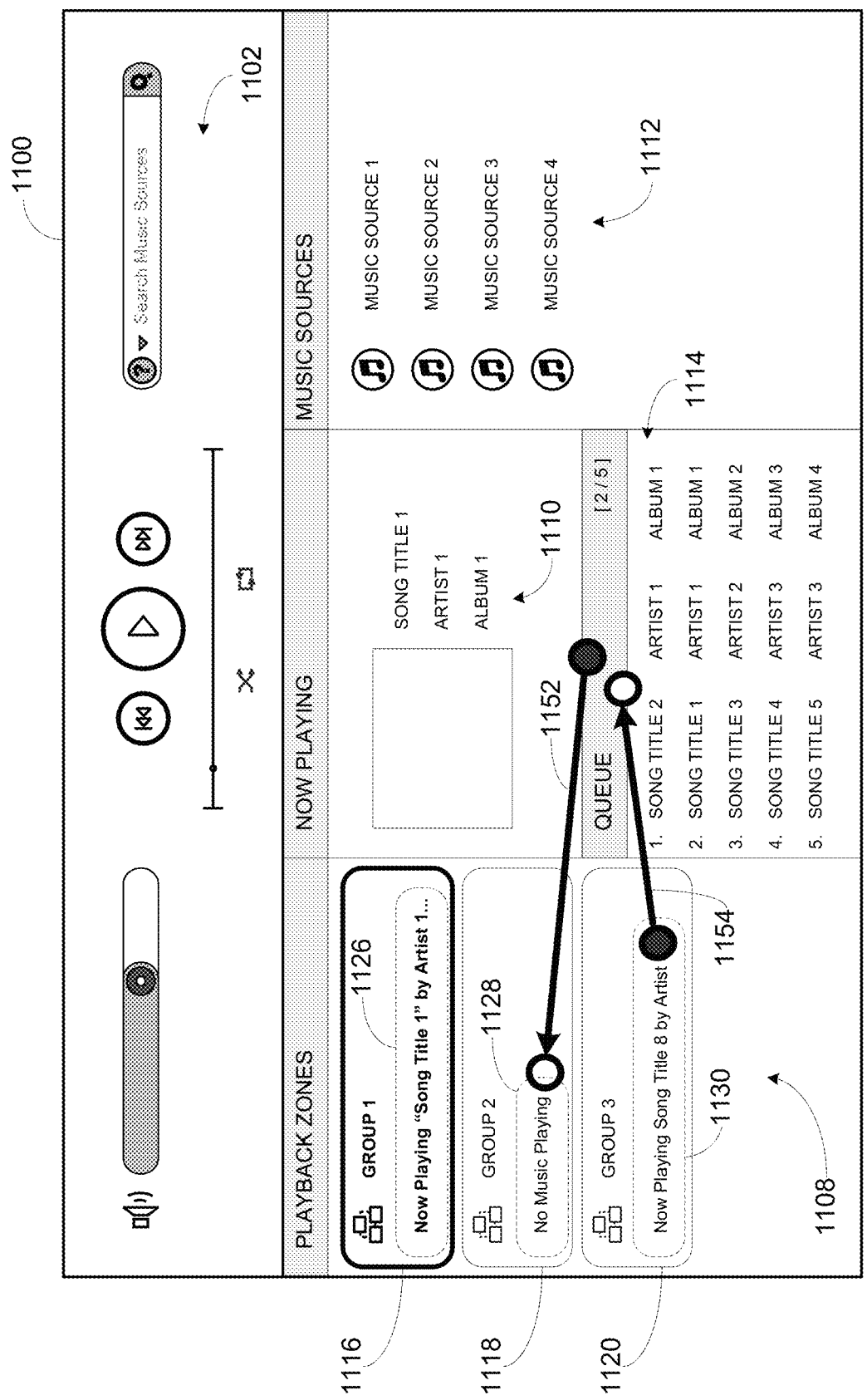
FIG. 11A shows a first example representation of a second example interface for transferring a playback queue in a network media system.

In addition to the first example interface shown in FIGS. 10A and 10B, FIG. 11A shows a first example representation 1100 of a second example interface for transferring a playback queue in a network media system. The first example representation 1100 of the second example interface includes a general network media system control panel 1102 for controlling playback of media items, controlling playback volumes, and accessing music sources associated with playback zones of the network media system. The example representation 1100 also includes a group region 1108, a music source region 1112, a now-playing region 1110, and a playback queue region 1114.

As shown, the group region 1108 includes one or more zone groups in the network media system, such as Group 1, Group 2, and Group 3, as identified by group icons 1116, 1118, and 1120, respectively. The group icons 1116, 1118, and 1120 may further include zone group queue identifiers 1126, 1128, and 1130 in relative positions to the group icons 1116, 1118, and 1120 to identify media items being rendered by Group 1, Group 2, and Group 3, respectively. In this example, the group icon 1116 may be visually distinct from group icons 1118 and 1120, or other group icons in the group region 1108. The visual distinction may indicate that the media item identified in the now-playing region 1110 and a playback queue shown in the playback queue region 1114 are associated with Group 1. In other words, as shown in FIG. 11A, the media item identified in the now-playing region 1110 is media item currently being played by playback devices in Group 1, and the playback queue shown in the playback queue region 1114 include items that are to be played by Group 1. Other example interfaces are also possible.

Referring back to the method 900 of FIG. 9, block 906 may involve receiving an input via the interface indicating a movement of a second queue representation to the particular position relative to the first zone representation. The second queue representation may be that of a second one or more playable items. Analogous to the first queue representation, the second queue representation may be previously in a position relative to a second zone representation of a second zone group, indicating that the second one or more playable items are currently being played by the second zone group.

In some cases, an alternative block of method 900 may involve receiving an input via the interface indicating a movement of the second zone representation to a position such that the first queue representation is in the particular relative position relative to the second zone representation. In other words, the received input may indicate a movement of a second queue representation to the position of the first queue representation, or a movement of the second zone representation to the position of the first zone representation.

In one example, referring back to FIG. 10B, the input indicating the movement of group or queue representations may include a swiping interaction with the interface, such as the swipe input 1082. In one example, the swiping interaction may involve causing the first zone representation to move such that the second queue representation is in the particular position relative to the first zone representation. In other words, as the swipe input 1082 may be used to navigate between the different group zone combinations, the swipe input 1082 may accordingly indicate movements of zone representations to a position such that the playback identifier 1052 (which may also be a queue representation, as indicated previously) is in the relative position of the zone representations, even if the playback identifier 1052 itself remains stationary.

In another example, the input indicating the movement of group or queue representations may include a drag-and-drop interaction with the interface, such as drag-and-drop interactions 1152 and 1154 as shown in FIG. 11A. As shown, the drag-and-drop interaction 1152 may involve dragging the playback queue region 1114 to the zone group queue representation 1128, which is in a relative position to group icon 1118 of Group 2. The drag-and-drop interaction 1154, as shown, may involve dragging the zone group queue representation 1130 in a relative position to group icon 1120 of Group 3 to the playback queue region 1114. While the drag-and-drop interactions 1152 and 1154 may be provided in different visual contexts on the interface 1100, both interaction inputs received at block 906 of method 900 may indicate a movement of a second queue representation to the particular position relative to the first zone representation.

As previously discussed, the input indicating the movement of the second queue representation to the particular position relative to the first zone representation may cause the second one or more playable items represented by the second queue representation to populate the queue associated with the playback zone represented by the first zone representation. As such, responsive to the input, a message may be sent to the device where the playback queue associated with the playback zone represented by the first zone representation is stored to cause the playback queue to be updated to include the second one or more playable items. In one case, if the playback queue previously included first one or more playable items, the first one or more playable items in the playback queue may be replaced by the second one or more playable items.

In one example, the interface and/or device where the playback queue is stored may be configured to store the first one or more playable items as a playlist, such that the replacement of the first one or more playable items may be undone if the user changes his or her mind. In one case, the first one or more playable items may be automatically stored as a playlist. In another case, the interface may be configured to provide on the interface a prompt for an indication of whether the first one or more playable items should be stored as the playlist. In other words, rather than automatically saving the first one or more playable items as a playlist, the user may be prompted to indicate whether he or she wishes to save the first one or more playable items as a playlist. In this case, the first one or more playable items in the playback queue may be stored as a playlist only if the interface receives from the user an input indicating that the first one or more playable items in the playback queue should be stored as a playlist. In either case, the interface may provide on the interface an indication that the first one or more playable items have been stored as a playlist. In one case, if the playback queue was previously empty, then the playback queue may simply be populated with the second one or more playable items.

Upon updating the playback queue to include the second one or more playable items, or in one case, replacing the first one or more playable items in the playback queue with the second one or more playable items, the interface may be updated to reflect resulting changes at block 908 and 910 of the method 900. In this case, block 908 may involve removing the first queue representation from the particular position relative to the first zone representation, and block 910 may involve providing the second queue representation in the particular position relative to the first zone representation. These modifications to the interface may indicate that the playback queue associated with the playback zone now includes the second one or more playable items.

Figure 11B:
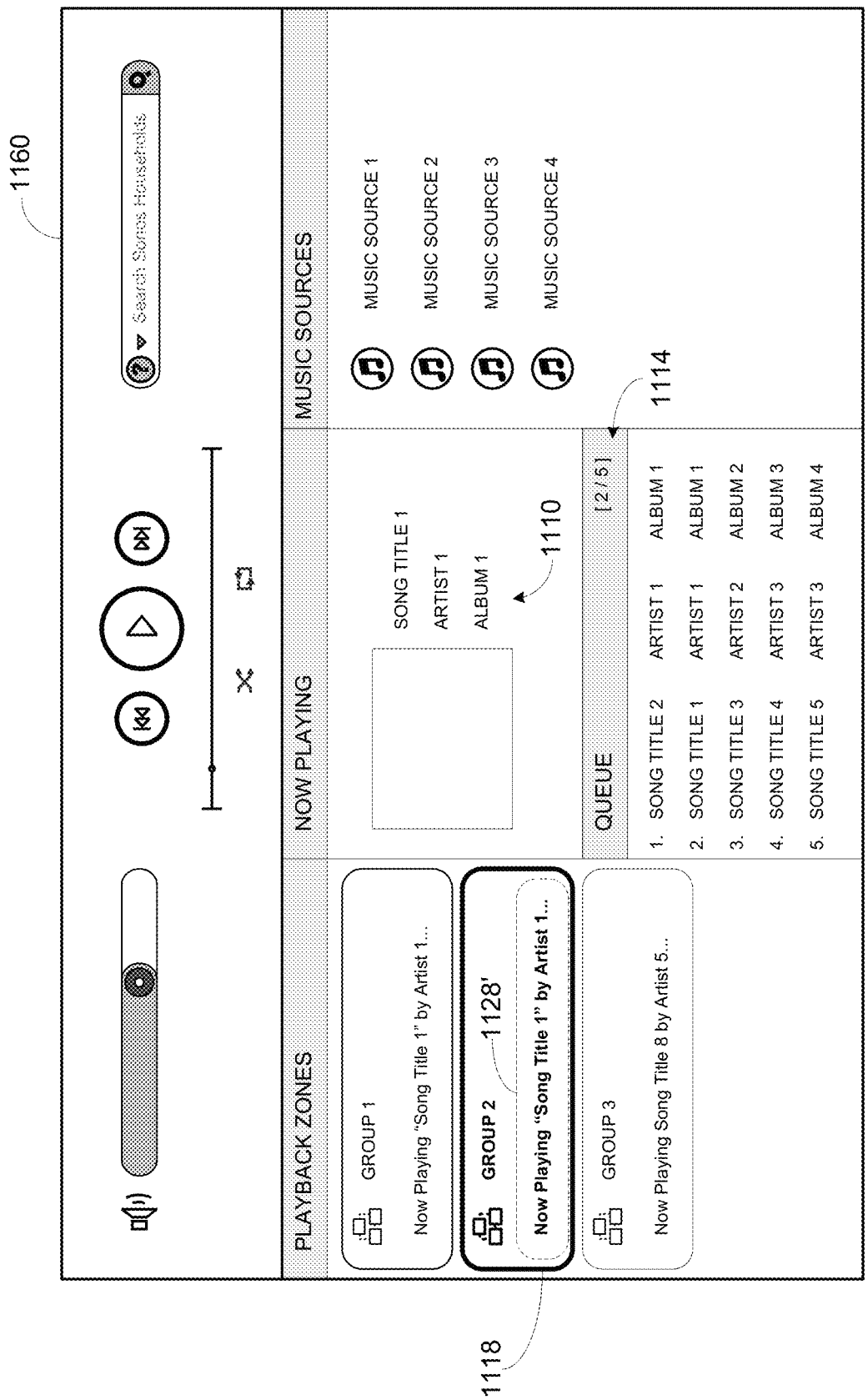
FIG. 11B shows a second example representation of the second example interface for transferring a playback queue in a network media system.

FIG. 11B shows a second example representation 1160 of the second example interface for transferring the playback queue in a network media system. In one example, the second example representation 1160 may be provided in response to the interaction 1152 shown in FIG. 11A. As shown, the playback queue as represented in the playback queue region 1114 may have been extended to the playback queue of Group 2, represented by zone group queue identifier 1128'. As such, the playback queue of Group 2 may have been populated with playable items shown in the playback queue region 1114 of FIG. 11A. In this example, the group icon 1118 may now be visually distinct indicating that the media item identified in the now-playing region 1110 and the playback queue shown in the playback queue region 1114 are associated with Group 2. In this case, because the playback queue of Group 2 was extended from the playback queue of Group 1, the now-playing region 1110 and the playback queue region 1114 may appear substantially the same for both Group 1 and Group 2.

Figure 11C:
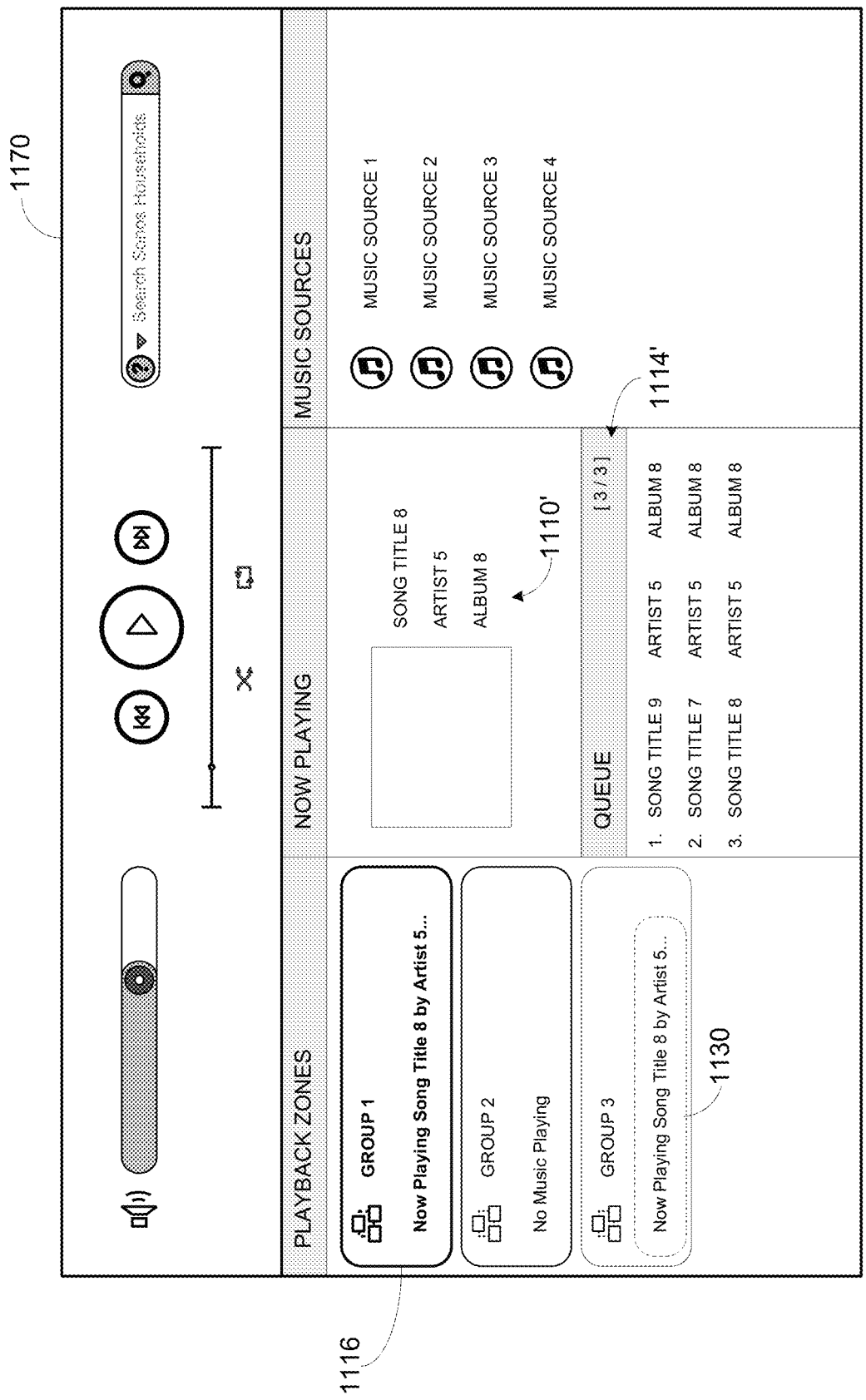
FIG. 11C shows a third example representation of the second example interface for transferring the playback queue in a network media system.

FIG. 11C shows a third example representation 1170 of the second example interface for transferring the playback queue in a network media system. In one example, the third example representation 1170 may be provided in response to the interaction 1154 shown in FIG. 11A. As shown, the playback queue of Group 3, as represented by the zone group identifier 1130 may have been extended to the playback queue associated with Group 1 and shown in the playback queue region 1114. As such, the playback queue associated with Group 1 may have been populated with playable items in the playback queue of Group 3. As shown, the playback queue region 1114' may have been updated with playable items in the playback queue of Group 3, and the now-playing region 1110' may have been updated to identify a media item from the playback queue of Group 3 that is currently being played. In this example, the group icon 1116 may still be visually distinct indicating that the media item identified in the now-playing region 1110' and the playback queue shown in the playback queue region 1114' are still associated with Group 1, though updated with items from the playback queue of Group 3. In this case, if Group 3 was selected to be viewed, the now-playing region 1110' and the playback queue region 1114' for Group 3 may appear substantially the same as Group 1, because the updated playback queue of Group 1 was extended from the playback queue of Group 3.

As discussed previously, the network media system discussed may include a plurality of playback devices and/or playback zones playing media content in synchrony. As such, when a playback queue being played by an original playback zone is extended to a new playback zone, the playback of media items in the playback queue by the original playback zone and the new playback zone may be configured to be in a substantially synchronous manner. In one case, if the playback queue is being transferred such that the original playback zone stops playing the media items of the playback queue as the new playback zone begins to play the media items in the playback queue, the playback of the of the media items in the playback queue by the original playback zone may fade out as the playback of the media items in the playback queue by the new playback zone may fade in, while in substantial synchrony with the fade out playback by the original playback zone.

Other example configurations and embodiments may also be possible.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application transferring a first playback queue from a first group of one or more playback zones to a second group of one or more playback zones within a network media system. In one aspect, a method is provided. The method involves providing a first zone representation of a playback zone on an interface. The playback zone comprises one or more playback devices, and the playback zone is associated with a playback queue comprising playable items to be played by the playback zone. The method further involves providing a first queue representation of a first one or more playable items in a particular position relative to the first zone representation on the interface. The particular position of the first queue representation indicates that the playback queue associated with the first playback zone comprises the first one or more playable items. The method also involve receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

In another aspect, a non-transitory computer readable memory is provided. The non-transitory computer readable memory has stored thereon instructions executable by a computing device to cause the computing device to perform functions. The functions include providing a first zone representation of a playback zone on an interface. The playback zone comprises one or more playback devices, and the playback zone is associated with a playback queue comprising playable items to be played by the playback zone. The functions further include providing a first queue representation of a first one or more playable items in a particular position relative to the first zone representation on the interface. The particular position of the first queue representation indicates that the playback queue associated with the first playback zone comprises the first one or more playable items. The functions also include receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

In yet another aspect, a device is provided. The device includes a processor and memory having stored thereon instructions executable by the processor to perform functions. The functions include providing a first zone representation of a playback zone on an interface. The playback zone comprises one or more playback devices, and the playback zone is associated with a playback queue comprising playable items to be played by the playback zone. The functions further include providing a first queue representation of a first one or more playable items in a particular position relative to the first zone representation on the interface. The particular position of the first queue representation indicates that the playback queue associated with the first playback zone comprises the first one or more playable items. The functions also include receiving an input via the interface causing a second queue representation of a second one or more playable items to be moved to the particular position relative to the first zone representation, and responsive to the input, modifying the interface to remove the first queue representation from the particular position relative to the first zone representation and providing the second queue representation in the particular position relative to the first zone representation, indicating that the playback queue associated with the playback zone now comprises the second one or more playable items.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A non-transitory computer-readable medium having stored therein instructions executable by one or more processors to cause a computing device to perform operations comprising:
   providing, in a playback zone region of an interface, a first zone representation, wherein the first zone representation represents a first playback zone that comprises one or more first playback devices, and wherein the first playback zone is associated with a first queue that includes one or more first media items;
   providing, in the playback zone region on the interface, a first queue representation in a particular position relative to the first zone representation, wherein the particular position of the first queue representation relative to the first zone representation indicates that the first queue is associated with the first playback zone;
   providing, in a playback queue region on the interface, a representation of the one or more first media items of the first queue;
   providing, in the playback zone region on the interface, a second zone representation, wherein the second zone representation represents a second playback zone that comprises one or more second playback devices; and wherein the second playback zone is associated with a second queue;
   receiving an input via the interface indicating a movement of at least a portion of the playback queue region to a particular position relative to the second zone representation, wherein the input causes the one or more first media items to be added to the second queue; and
   based on the input, modifying the interface to indicate that the second queue includes the one or more first media items.

2. The non-transitory computer-readable medium of claim 1, wherein the second queue includes one or more second media items, and wherein causing the one or more first media items to be added to the second queue comprises replacing the one or more second media items with the one or more first media items.

3. The non-transitory computer-readable medium of claim 2, wherein the operations further comprise:
   based on the input, providing on the interface an indication that the one or more second media items have been stored as a playlist.

4. The non-transitory computer-readable medium of claim 3, wherein the operations further comprise:
   providing on the interface a prompt to store the one or more second media items as a playlist; and
   receiving a second input that causes the one or more second media items to be stored as a playlist.

5. The non-transitory computer-readable medium of claim 1, wherein causing the one or more first media items to be added to the second queue comprises sending a command that instructs the given second playback device to populate the second queue with the one or more first media items.

6. The non-transitory computer-readable medium of claim 1, wherein the operations further comprise:
   providing, on the interface, a second queue representation in the particular position relative to the second zone representation, wherein the particular position of the second queue representation relative to the second zone representation indicates that the second queue is associated with the second playback zone; and
   based on the input, removing the second queue representation from the particular position relative to the second zone representation.

7. The non-transitory computer-readable medium of claim 1, wherein the first queue is stored on a given first playback device, and wherein the second queue is stored on a given second playback device.

8. The non-transitory computer-readable medium of claim 1, wherein the operations further comprise: based on the input, joining the first playback zone and the second zone into a zone group that is associated with a shared queue, wherein the shared queue includes the one or more first media items; and causing the one or more first playback devices and the one or more second playback devices of the zone group to play back the one or more first media items in substantial synchrony.

9. The non-transitory computer-readable medium of claim 1, wherein the operations further comprise: based on the input, initiating playback of the one or more first media items by the one or more second playback devices and stopping playback of the one or more first media items by the one or more first playback devices.

10. The non-transitory computer-readable medium of claim 1, wherein the interface comprises a touch-sensitive graphical interface, and wherein receiving the input via the interface indicating the movement of the first queue representation from the particular position relative to the first zone representation to the particular position relative to the second zone representation comprises receiving an input indicating a swiping movement via the touch-sensitive graphical interface from the particular position relative to the first zone representation to the particular position relative to the second zone representation.

11. The non-transitory computer-readable medium of claim 1, wherein receiving the input via the interface indicating the movement of the first queue representation from the particular position relative to the first zone representation to the particular position relative to the second zone representation comprises receiving an input indicating a drag and drop input from the particular position relative to the first zone representation to the particular position relative to the second zone representation.

12. The non-transitory computer-readable medium of claim 1, wherein the first queue comprises one or more respective uniform resource identifiers (URIs) of the one or more first media items and wherein causing the one or more first media items to be added to the second queue comprises replacing zero or more URIs of the second queue with the one or more respective uniform resource identifiers (URIs) of the one or more first media items.

13. A non-transitory computer-readable medium having stored therein instructions executable by one or more processors to cause a computing device to perform operations comprising:

provide, in a playback zone region of an interface, a first zone representation, wherein the first zone representation represents a first playback zone that comprises one or more first playback devices, and wherein the first playback zone is associated with a first queue that includes one or more first media items;

providing, in the playback zone region on the interface, a first queue representation in a particular position relative to the first zone representation, wherein the particular position of the first queue representation relative to the first zone representation indicates that the first queue is associated with the first playback zone;

providing, in a playback queue region on the interface, a representation of the one or more first media items of the first queue;

providing, in the playback zone region on the interface, a second zone representation, wherein the second zone representation represents a second playback zone that comprises one or more second playback devices; and wherein the second playback zone is associated with a second queue that includes one or more second media items;

providing, in the playback zone region on the interface, a second queue representation in a particular position relative to the second zone representation, wherein the particular position of the second queue representation relative to the first zone representation indicates that the second queue is associated with the first playback zone; and receiving an input via the interface indicating a movement of the second queue representation into the playback queue region, wherein the input causes the one or more second media items to replace the one or more first media items.

14. The non-transitory computer-readable medium of claim 13, wherein the operations further comprise: based on the received input modifying the first queue representation to indicate that the first queue includes the one or more second media items.

15. The non-transitory computer-readable medium of claim 13, wherein the operations further comprise: based on the input, joining the first playback zone and the second playback zone into a zone group that is associated with the second queue, wherein the second queue includes the one or more second media items; and causing the one or more first playback devices and the one or more second playback devices of the zone group to play back the one or more first media items in substantial synchrony.

16. The non-transitory computer-readable medium of claim 13, wherein the operations further comprise: based on the input, initiating playback of the one or more second media items by the one or more first playback devices and stopping playback of the one or more second media items by the one or more second playback devices.

17. The non-transitory computer-readable medium of claim 13, wherein causing the one or more first media items to be added to the second queue comprises sending a command that instructs a given first playback device to populate the first queue with the one or more second media items.

18. A non-transitory computer-readable medium having stored therein instructions executable by one or more processors to cause a computing device to perform operations comprising:

providing, in a playback zone region of the interface, a zone representation, wherein the zone representation represents a first playback zone that comprises one or more first playback devices; and wherein the first playback zone is associated with a first queue that includes one or more first media items;

providing, in the playback zone region on the interface, a first queue representation in a particular position relative to the zone representation, wherein the particular position of the first queue representation relative to the zone representation indicates that the first queue is associated with the first playback zone;

providing, in a playback queue region on the interface, a representation of the one or more first media items of the first queue;

providing, in the playback zone region of an interface, a group representation, wherein the group representation represents a zone group that comprises one or more second playback devices of a second playback zone and one or more third playback devices of a third playback zone, and wherein the zone group is associated with a second queue;

receiving an input via the interface indicating a movement of at least a portion of the playback queue region to a particular position relative to the group representation, wherein the input causes the one or more first media items to be added to the second queue; and based on the input, modifying the playback zone region of the interface to indicate that the second queue includes the one or more first media items.

19. The non-transitory computer-readable medium of claim 18, wherein the second queue includes one or more second media items, and wherein causing the one or more first media items to be added to the second queue comprises replacing the one or more second media items with the one or more first media items.

20. The non-transitory computer-readable medium of claim 18, wherein the operations further comprise: based on the input, joining the first playback zone into the zone group that is associated with the second queue, wherein the second queue includes the one or more first media items; and causing the one or more first playback devices, the one or more second playback devices, and the one or more third playback devices of the zone group to play back the one or more first media items in substantial synchrony.

21. The non-transitory computer-readable medium of claim 18, wherein the operations further comprise: based on the input, initiating playback of the one or more first media items by the one or more second playback devices and the one or more third playback devices.

22. The non-transitory computer-readable medium of claim 18, wherein causing the one or more first media items to be added to the second queue comprises sending a command that instructs a given device to populate the second queue with the one or more first media items.

* * * * *